United States Patent
Rappoport et al.

(10) Patent No.: US 9,153,856 B2
(45) Date of Patent: Oct. 6, 2015

(54) EMBEDDED ANTENNA STRUCTURES

(75) Inventors: Benjamin M. Rappoport, Los Gatos, CA (US); Bruce E. Berg, Santa Clara, CA (US); John Raff, Menlo Park, CA (US); Stephen R. McClure, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 494 days.

(21) Appl. No.: 13/243,549

(22) Filed: Sep. 23, 2011

(65) Prior Publication Data

US 2013/0076573 A1 Mar. 28, 2013

(51) Int. Cl.
*H01Q 1/24* (2006.01)
*H01Q 9/42* (2006.01)

(52) U.S. Cl.
CPC ............... *H01Q 1/243* (2013.01); *H01Q 9/42* (2013.01); *Y10T 29/49016* (2015.01)

(58) Field of Classification Search
CPC .......... H01Q 1/243; H01Q 1/40; H01Q 1/405
USPC .............................. 343/702, 872, 873; 29/600
See application file for complete search history.

(56) References Cited

U.S. PATENT DOCUMENTS

| | | | |
|---|---|---|---|
| 6,054,955 A | 4/2000 | Schlegel, Jr. et al. | |
| 6,307,520 B1 | 10/2001 | Liu | |
| 6,339,400 B1 | 1/2002 | Flint et al. | |
| 6,686,886 B2 | 2/2004 | Flint et al. | |
| 6,825,751 B1 | 11/2004 | Kita et al. | |
| 7,271,769 B2 | 9/2007 | Asano et al. | |
| 7,916,089 B2 | 3/2011 | Schlub et al. | |
| 2005/0001767 A1 | 1/2005 | Wulff et al. | |
| 2006/0091398 A1 | 5/2006 | Yamaguchi et al. | |
| 2006/0250897 A1 | 11/2006 | Brewer | |
| 2007/0038516 A1 | 2/2007 | Apple | |
| 2007/0060044 A1 | 3/2007 | Lamb | |
| 2007/0283145 A1 | 12/2007 | Gressel | |
| 2008/0122705 A1* | 5/2008 | Kurashima et al. | 343/702 |
| 2009/0002242 A1 | 1/2009 | Lasarov et al. | |
| 2009/0058737 A1* | 3/2009 | Tsujimura et al. | 343/702 |
| 2009/0140936 A1 | 6/2009 | Cho et al. | |
| 2009/0174612 A1* | 7/2009 | Ayala et al. | 343/702 |
| 2009/0257232 A1 | 10/2009 | Lam | |
| 2010/0271281 A1 | 10/2010 | Tsao et al. | |
| 2010/0277384 A1 | 11/2010 | Gierow | |
| 2010/0283706 A1 | 11/2010 | Tsao et al. | |
| 2011/0134012 A1* | 6/2011 | Yang et al. | 343/873 |
| 2012/0038518 A1* | 2/2012 | Wu et al. | 343/702 |
| 2012/0223866 A1* | 9/2012 | Ayala Vazquez et al. | 343/702 |
| 2013/0076573 A1 | 3/2013 | Rappoport et al. | |

FOREIGN PATENT DOCUMENTS

JP 2006048166 A * 2/2006

* cited by examiner

*Primary Examiner* — Dieu H Duong
(74) *Attorney, Agent, or Firm* — Treyz Law Group; G. Victor Treyz; Joseph F. Guihan

(57) ABSTRACT

An electronic device may be provided with antenna structures that are embedded in a dielectric such as plastic. The plastic may be molded over the antenna structures using molding equipment. Antenna structures may be embedded in molded plastic structures such as plastic electronic device housing structures. The plastic electronic device housing structures may form housing structures such as housing wall structures. The antenna structures may be embedded within the housing wall structures in the vicinity of an exterior surface of the housing wall structures. Embedded antenna structures may also be mounted under other dielectric structures such portions of a display cover layer.

18 Claims, 10 Drawing Sheets

EMBEDDED ANTENNA STRUCTURES

BACKGROUND

This relates generally to electronic devices, and more particularly, to electronic devices that have antennas.

Antennas are used to provide electronic devise such as cellular telephones and computers with wireless communications capabilities. In conventional configurations, antennas are formed from patterned traces on a printed circuits or metal layers on interior housing surfaces. Particularly in compact devices where space is at a premium, antenna configurations such as these can be less than optimal, because the antenna structures consume part of the interior volume of the devices. Antenna performance for the antenna structures can also vary significantly from device to device due to manufacturing variations that affect the placement of the antenna structures relative to nearby housing structures. Variations in antenna performance can make mass manufacturing difficult and can lead to antennas that do not perform as well as expected.

It would therefore be desirable to provide a way to provide improved electronic device antenna structures.

SUMMARY

An electronic device may be provided with antenna structures that are embedded in a dielectric such as plastic. The plastic may be molded over the antenna structures using molding equipment. Antenna structures may be embedded in molded plastic structures such as plastic electronic device housing structures. The plastic electronic device housing structures may form housing wall structures. The antenna structures may be embedded within the housing wall structures in the vicinity of an exterior surface of the housing wall structures. Embedded antenna structures may also be mounted under other dielectric structures such portions of a display cover layer in an electronic device.

Conductive materials such as metal may be patterned to form the antenna structures. Patterning techniques that may be used for forming the antenna structures include mechanical machining, electrochemical deposition (e.g., electrochemical deposition onto substrates containing patterned plastic portions with different affinities for deposited metal), etching, laser processing, and metallic paint deposition techniques (e.g., inkjet printing, painting, pad printing, screen printing, etc.).

Further features of the invention, its nature and various advantages will be more apparent from the accompanying drawings and the following detailed description of the preferred embodiments.

DETAILED DESCRIPTION

Figure 1:
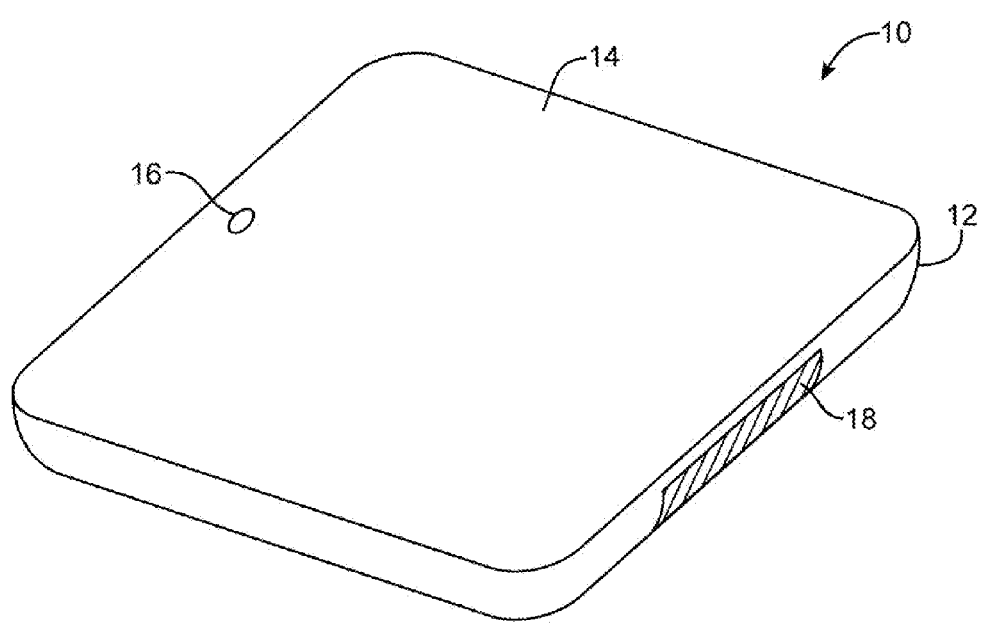
FIG. 1 is a perspective view of an illustrative electronic device with embedded antenna structures in accordance with an embodiment of the present invention.

An illustrative electronic device of the type that may be provided with embedded antenna structures is shown in FIG. 1. Electronic devices such as illustrative electronic device 10 of FIG. 1 may be laptop computers, tablet computers, cellular telephones, media players, other handheld and portable electronic devices, smaller devices such as wrist-watch devices, pendant devices, headphone and earpiece devices, other wearable and miniature devices, or other electronic equipment.

As shown in FIG. 1, device 10 includes housing 12. Housing 12, which is sometimes referred to as a case, may be formed of materials such as plastic, glass, ceramics, carbon-fiber composites and other fiber-based composites, metal, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing wall structures that have been mounted to internal frame elements or other internal housing structures).

In some situations, housing 12 may be formed from a dielectric such as plastic, glass, ceramic, fiber-based composites, other dielectric materials, or combinations of these materials. In other situations, housing 12 or at least some of the structures that make up housing 12 may be formed from metal elements. In a housing configuration with conductive structures such as metal housing walls, a localized portion of housing 12 may be formed form a dielectric structure such as dielectric structure 18 of FIG. 1. Dielectric structure 18 may be, for example, a plastic portion of housing 12 that serves as an antenna window that allows radio-frequency antenna signals to be transmitted and received by antenna structures in device 10. Device 10 may, if desired, have a display such as display 14. Portions of a display cover layer over display 14 and other dielectric structures in device 10 may also be used to allow radio-frequency antenna signals to be transmitted and received by antenna structures in device 10.

Display 14 may be a touch screen that incorporates capacitive touch electrodes or other touch sensors or may be touch insensitive. Display 14 may include image pixels formed from light-emitting diodes (LEDs), organic LEDs (OLEDs), plasma cells, electronic ink elements, liquid crystal display (LCD) pixels, or other suitable image pixel structures. A cover layer such as a cover glass member or a transparent planar plastic member may cover the surface of display 14.

Buttons such as button 16 may pass through openings in the cover layer. Openings may also be formed in the glass or plastic display cover layer of display 14 to form other openings if desired. Openings may also be formed in housing 12 (e.g., for forming input-output ports, microphone ports, speaker ports, button openings, etc.).

Housing 12 may include a rear housing structure such as a planar glass member, plastic structures, metal structures, fiber-composite structures, or other structures. Housing 12 may also have sidewall structures. The sidewall structures may be formed from extended portions of the rear housing structure or may be formed from one or more separate members. Housing 12 may include a peripheral housing member such as a peripheral conductive housing member. Device 10 may have a rectangular periphery. The peripheral conductive housing member may run along some or all of the rectangular periphery. The peripheral conductive housing member may form a bezel that surrounds display 14. If desired, the peripheral conductive housing member may be implemented using a metal band or other conductive structure that forms conductive vertical sidewalls for housing 12. Peripheral conductive housing members or other housing structures (e.g., a substantially planar dielectric rear housing structure) may also be used in device 10 to form curved or angled sidewall structures or housings with other suitable shapes.

Wireless communications circuitry in device 10 may be used to form remote and local wireless links. One or more antennas may be used during wireless communications. Single band and multiband antennas may be used. For example, a single band antenna may be used to handle local area network communications at 2.4 GHz (as an example). As another example, a multiband antenna may be used to handle cellular telephone communications in multiple cellular telephone bands. Antennas may also be used to receive global positioning system (GPS) signals at 1575 MHz in addition to cellular telephone signals and/or local area network signals. Other types of communications links may also be supported using single-band and multiband antennas.

Antennas may be located at any suitable locations in device 10. For example, one or more antennas may be embedded within a dielectric antenna window structure such as antenna window structure 18 (e.g., an antenna window structure that is formed from a plastic member or other dielectric structure that is mounted within an opening in a conductive housing structure such as a metal housing). If desired, all or substantially all of housing 12 may be formed from a dielectric housing structure. When all or substantially all of housing 12 is formed from dielectric materials, the location for the antennas need not be restricted to particular dielectric antenna window locations (i.e., the antennas may be formed within any portion of the dielectric housing structure). For example, the antenna structures may be located at one or more locations along device edges, in the center of a rear planar housing portion, in device corners, etc.

Antennas in device 10 may be used to support any communications bands of interest. For example, device 10 may include antenna structures for supporting local area network communications (e.g., IEEE 802.11 communications at 2.4 GHz and 5 GHz for wireless local area networks), signals at 2.4 GHz such as Bluetooth® signals, voice and data cellular telephone communications (e.g., cellular signals in bands at frequencies such as 700 MHz, 850 MHz, 900 MHz, 1800 MHz, 1900 MHz, 2100 MHz, etc.), global positioning system (GPS) communications at 1575 MHz, signals at 60 GHz (e.g., for short-range links), etc.

Figure 2:
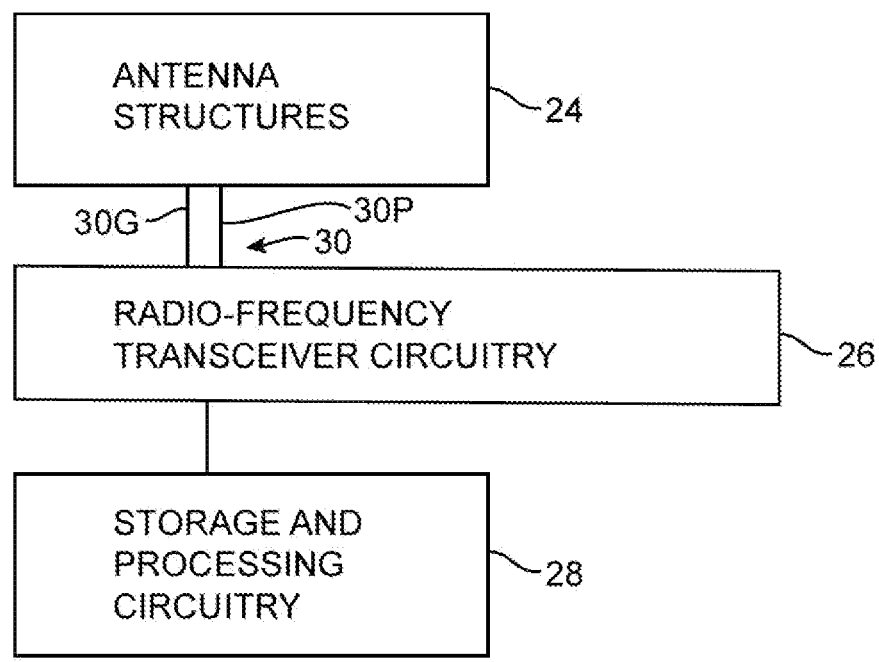
FIG. 2 is a schematic diagram of an illustrative electronic device with antenna structures in accordance with an embodiment of the present invention.

A schematic diagram showing illustrative components that may be used in supporting wireless communications in device 10 of FIG. 1 is shown in FIG. 2. As shown in FIG. 2, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, baseband processors, etc. Input-output circuitry such as user interface components may be coupled to storage and processing circuitry 28.

Radio-frequency transceiver circuitry 26 may transmit and receive radio-frequency signals using antenna structures 24. Radio-frequency transceiver circuitry 26 may include transceiver circuitry that handles 2.4 GHz and 5 GHz bands for WiFi® (IEEE 802.11) communications, the 2.4 GHz Bluetooth® communications band, and wireless communications in cellular telephone bands at 700 MHz, 850 MHz, 900 MHz, 1800 MHz, 1900 MHz, and 2100 MHz (as examples). Circuitry 26 may also include circuitry for other short-range and long-range wireless links. For example, transceiver circuitry 26 may be used in handling signals at 60 GHz. If desired, transceiver circuitry 26 may include global positioning system (GPS) receiver equipment for receiving GPS signals at 1575 MHz or for handling other satellite positioning data.

Radio-frequency transceiver circuitry 26 may be coupled to antenna structures 24 using a transmission line such as transmission line 30. Transmission line 30 may include a positive signal conductor such as conductor (path) 30P and a ground signal conductor (path) 30G. Paths 30P and 30G may be formed on rigid and flexible printed circuit boards, may be formed on dielectric support structures such as plastic, glass, and ceramic members, may be formed as part of a cable, etc. Transmission line 30 may be formed using one or more microstrip transmission lines, stripline transmission lines, edge coupled microstrip transmission lines, edge coupled stripline transmission lines, coaxial cables, or other suitable transmission line structures.

Radio-frequency front end circuitry (e.g., switches, impedance matching circuitry, radio-frequency filters, and other circuits) may be interposed in the signal path between radio-frequency transceiver circuitry 26 and the antennas in device 10 if desired.

Antenna structures 24 may include one or more antennas of any suitable type. For example, antenna structures 24 may include one or more antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
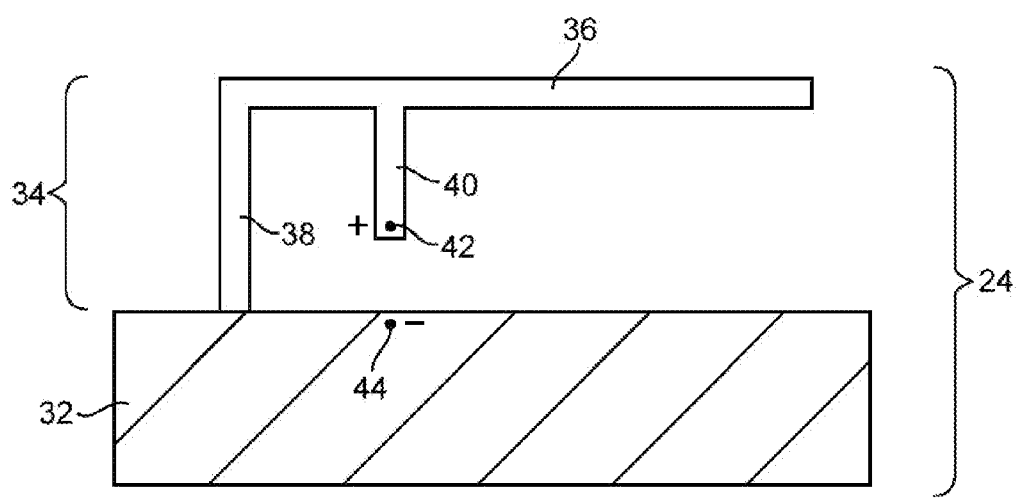
FIG. 3 is a diagram of illustrative antenna structures in accordance with an embodiment of the present invention.

A diagram of illustrative configuration for antenna structures 24 (i.e., the conductive structures used in forming one or more antennas for device 10) is shown in FIG. 3. In the example of FIG. 3, antenna structures 24 have been based on an inverted-F antenna design. The inverted-F antenna structures of FIG. 4 have ground plane 32 and inverted-F antenna resonating element 34. Inverted-F antenna resonating element 34 may have a main resonating element arm such as arm 36. A short circuit branch such as short circuit branch 38 may be used to couple arm 36 to ground plane 32. Positive antenna feed terminal 42 may be coupled to antenna resonating element feed branch 40. Ground antenna feed terminal 44 may be coupled to ground plane 32. Antenna feed terminals 40 and 44 may form an antenna feed for the inverted-F antenna of FIG. 3. Signals from positive transmission line conductor 30P (FIG. 2) may be provided to positive antenna feed terminal 42. Signals from ground transmission line conductor 30G (FIG. 2) may be provided to ground antenna feed terminal 44.

The structures of FIG. 3 may be formed from conductive materials such as copper, gold, other metals, other conductive materials, or combinations of these materials. If desired, other types of antenna may be used in forming antenna structures 24. The inverted-F antenna design of FIG. 3 is merely illustrative.

Figure 4:
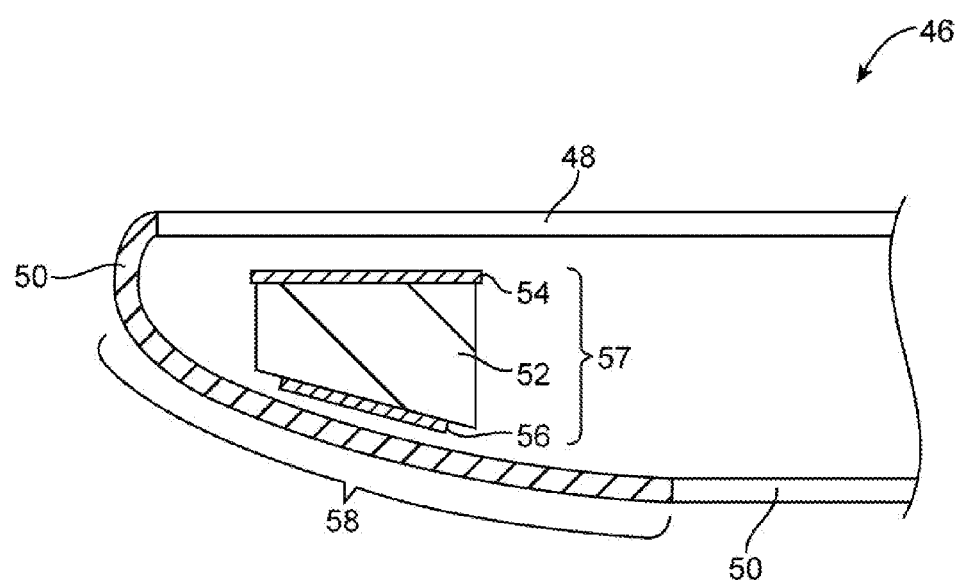
FIG. 4 is a cross-sectional side view of conventional electronic device antenna structures.

FIG. 4 is a cross-sectional side view of a conventional antenna configuration. As shown in FIG. 4, device 46 has display cover glass layer 48, which is mounted in metal housing 50. Plastic antenna window 58 allows radio-frequency signals to be transmitted and received by antenna structures 57. Structures 57 may include patterned flexible printed circuits 54 and 56 that are mounted to the exterior of plastic carrier 52. Flexible printed circuits 54 and 56 include patterned metal traces that form antenna resonating element structures for antenna structures 57. Conductive device structures such as conductive housing 50 form an antenna ground.

With conventional arrangements of the type shown in FIG. 4, variations in the placement of antenna structures (e.g., variations in the size of carrier 52 and/or the location of carrier 42, variations in the spacing between printed circuits 54 and 56 and nearby structures such as carrier 52, display cover glass 48, and the device housing, etc.) can create undesired antenna performance variations. The amount of space that is consumed within the interior of device 46 may also be larger than desired due to the interior location of antenna structures 57 inside housing walls 50 and device 46.

To address concerns such as these, device 10 may be provided with antenna structures that are embedded within dielectric. The antenna structures may, for example, be embedded within injection-molded plastic. With this type of arrangement, dielectric (e.g., plastic) may be molded over the conductive members that form the antenna structures (i.e., the antenna structures may be overmolded with plastic). Overmolded antenna structures such as these may be used in forming space-efficient housing layouts in which the antenna(s) for device 10 are located within part of the housing wall thickness that would otherwise be unused. Overmolded antenna structures may also be used in interior portions of device 10 (e.g., to help reduce part counts, to help reduce spacing variations that might arise forming antenna assemblies from multiple separate parts, etc.).

Figure 5:
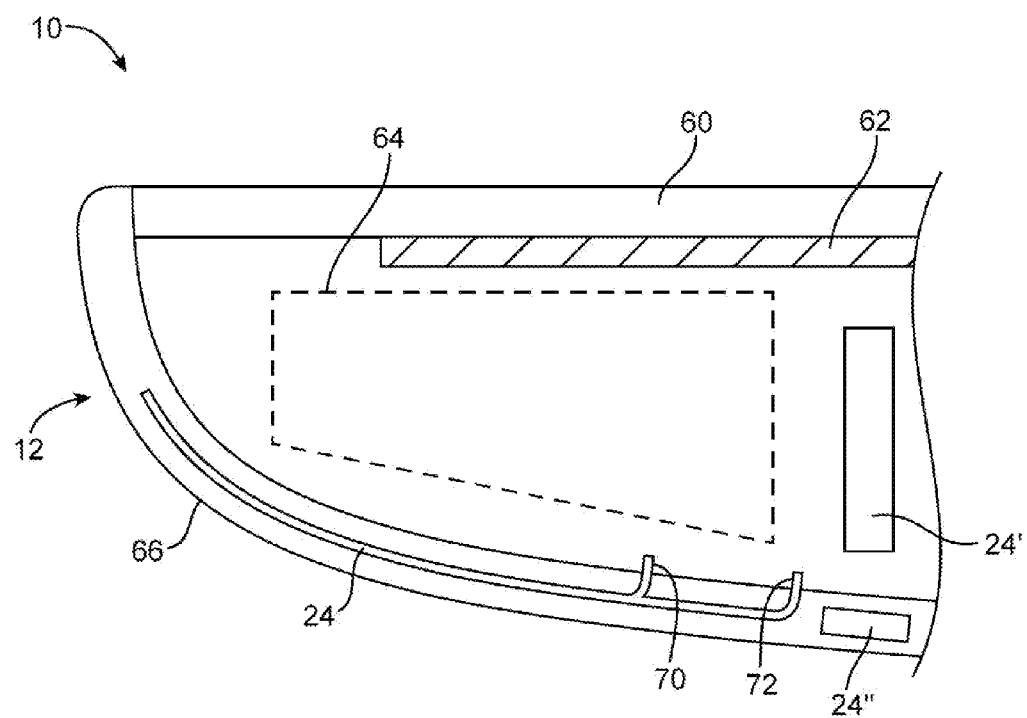
FIG. 5 a cross-sectional side view of a portion of an electronic device having antenna structures embedded within a housing wall in accordance with an embodiment of the present invention.

A cross-sectional side view of a portion of an illustrative electronic device having embedded antenna structures is shown in FIG. 5. As shown in FIG. 5 device 10 may have a housing such as housing 12. Display cover layer 60 (e.g., a display cover glass layer or a layer of transparent plastic or other transparent member associated with display 14) may be formed over display structures such as display module 62. Display module 62 may contain active image pixels that are used in creating images for a user of device 10.

Housing 12 may have a wall such as wall 66 that forms curved sidewalls around the periphery of device 10 (as an example). The sidewall portions of housing 12 in this type of configuration may have planar surfaces that curve smoothly upwards from a substantially planar rear housing wall portion. In configurations with other types of housing wall shapes, such as shapes with vertical sidewalls, the housing may have a planar rear member that is attached to a separate vertical sidewall member or that is formed as an integral portion of vertical sidewall members.

Antenna structures 24 may be embedded within housing wall structures such as housing wall 66 or other dielectric structures in device 10. This may help save space within device 10 and may therefore help accommodate internal device components in device 10 (e.g., in interior volume 64). Antenna structures 24 may, for example, be formed from substantially planar patterned metal structures (e.g., a sheet of patterned metal, patterned metal traces on a flexible or rigid planar substrate, etc.). The plane (flat or curved) of antenna structures 24 may lie parallel to the planar shape of housing wall 66 and/or the planar exterior surface of housing wall 66. For example, in a configuration in which housing wall 66 has a curved planar exterior surface and antenna structures 24 contain patterned planar conductive structures (e.g., correspondingly curved planar structures formed from a patterned metal member, a printed circuit such as a curved flex circuit, etc.), antenna structures 24 can be embedded within housing wall 66 so that antenna structures 24 lie within the interior of housing wall 66 at a substantially constant distance from the exterior surface of housing wall 66 (i.e., antenna structures 24 may run parallel to the exterior surface of housing wall 66).

To facilitate the formation of electrical contacts for forming an antenna feed (e.g., positive and/or ground antenna feed terminals), portions of the metal structures or other conductive structures that make up antenna structures 24 may be configured to protrude through the surface of the overmolded dielectric. For example, conductive structures such as portions 70 and 72 of antenna structures 24 may be configured to protrude through the surface of housing wall 66 and may serve as one or more antenna terminals (e.g., antenna feed terminals such as feed terminals 42 and/or 44 of FIG. 3). Circuitry in device 10 (e.g., transmission line circuitry, filters, switches, impedance matching circuitry, and other radio-frequency front-end circuitry) may be attached to one or more antenna structure terminals such as illustrative terminals 70 and 72.

Antenna structures 24 may include antenna resonating element structures such as antenna resonating element 34 of FIG. 3 and/or ground plane structures such as ground structures 32 of FIG. 3. If desired, one or more additional conductive structures may be used to form parasitic antenna elements, ground structures, or antenna resonating element structures. For example, additional components such as conductive structure 24" may be embedded within housing wall 66 to form part of antenna structures 24 (e.g., a ground structure, a parasitic antenna element, etc.). Conductive structures such as conductive structures 24' that are not embedded within housing wall structures 66 may also be used to form part of antenna structures 24 (e.g., a ground structure, a parasitic antenna element, etc.). In configurations where structures such as structures 24" or 24' are used to form an antenna ground plane structure, a portion of structures 24" or 24' may be used in forming ground antenna feed terminal 44.

Figure 6:
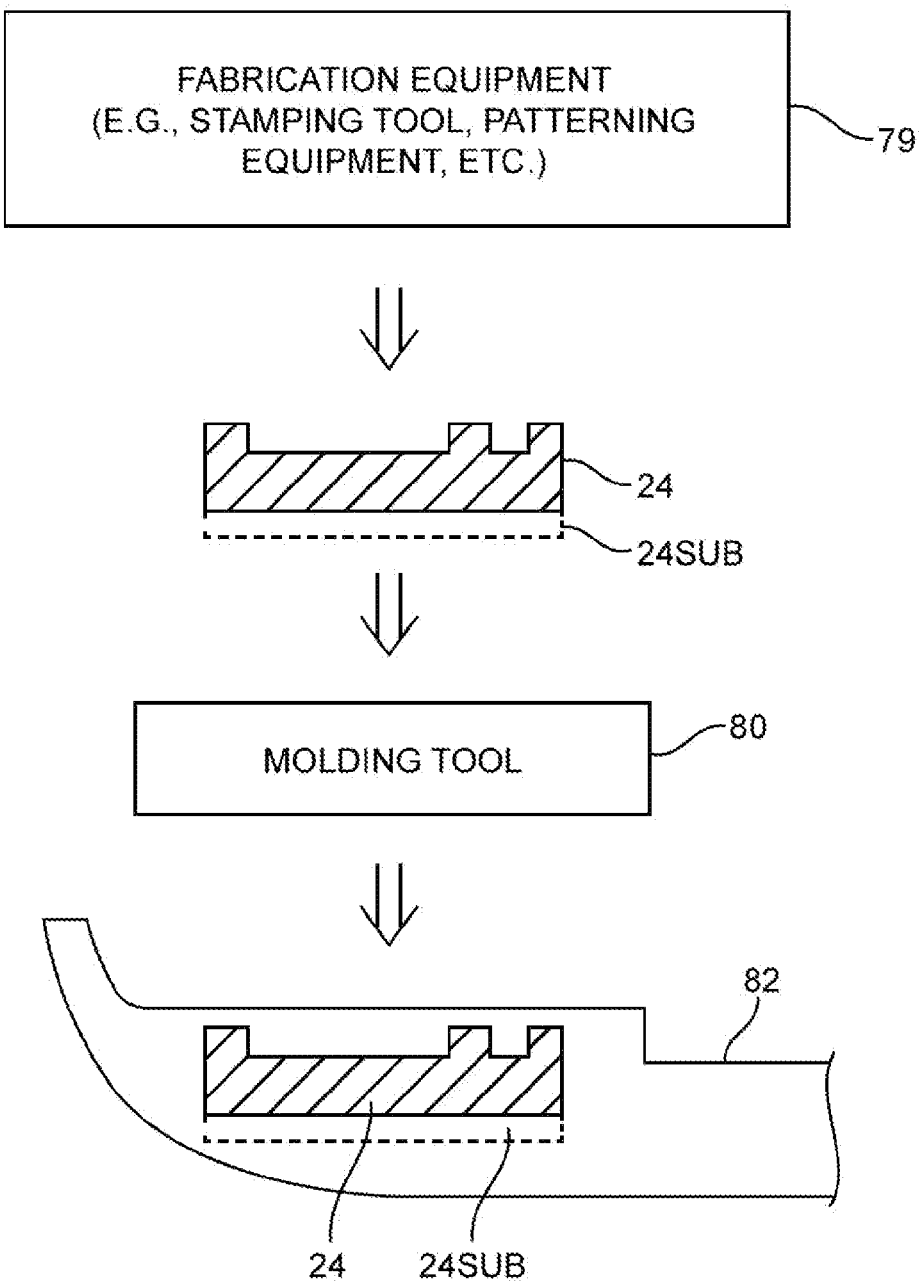
FIG. 6 is a diagram showing how antenna structures may be embedded within a dielectric using an overmolding process in accordance with an embodiment of the present invention.

FIG. 6 is a diagram showing an illustrative approach for forming embedded antenna structures 24. As shown in FIG. 6, fabrication equipment 79 may be used in forming antenna structures 24. Fabrication equipment 79 may include metal stamping equipment, machining equipment, or other equipment for forming antenna structures 24 from metal structures such as sheet metal (to produced stamped metal foil antenna structures), wire, or other metal structures. If desired, fabrication equipment 79 may include patterning equipment that uses chemical treatment (e.g., electrochemical deposition equipment to form electrochemically deposited structures, photolithography equipment such as dry or wet etching equipment to form etched structures, etc.), light-based machining (e.g., laser machining), mechanical machining, or other patterning and machining techniques. Fabrication equipment 79 may also include equipment for forming conductive patterns from metallic liquids (e.g., gold paint, silver paint, conductive ink, etc.). Equipment for patterning metallic liquids may include spraying equipment, dripping equipment, pad printing equipment, screen printing equipment, ink-jet printing equipment, and painting equipment (as examples).

The antenna structures that are formed by fabrication equipment 79 may include conductive antenna structures such as ground plane 32 and antenna resonating element 34 of FIG. 3 and optional dielectric substrate structures such as structure 24SUB. Dielectric structures 24SUB may be, for example, a flexible printed circuit ("flex circuit") substrate formed from a sheet of flexible polymer such as polyimide, a rigid printed circuit substrate such as a layer of fiberglass-filled epoxy (e.g., FR4), a plastic carrier, or other dielectric substrate on which patterned metal traces have been formed to form conductive antenna structures 24.

Once antenna structures 24 (including any optional dielectric portions) have been fabricated using equipment 79, molding tool 80 may be used to overmold plastic 82 to form overmolded antenna structures 24 of FIG. 6. Molding tool 80, which may sometimes be referred to as an injection molding tool or an insert molding tool, may create a desired shape for plastic 82 by injection molding plastic 82 into a die cavity with a desired shape while maintaining structures (including optional substrate 24) at a desired position within the cavity.

In general, any suitable technique may be used in forming antenna structures 26. With one suitable arrangement, laser patterning may be used in forming antenna structures 26. Laser patterning processes may use thermoplastic materials that can be locally sensitized by exposure to laser light. Once sensitized, electroplating may be used to deposit additional metal and thereby form a desired pattern of conductive antenna structures. Laser patterning techniques of this type are sometimes referred to as Laser Direct Structuring (LDS). Tools for implementing these techniques are available from LPFK Laser & Electronics AG of Garbsen, Germany.

Figure 7:
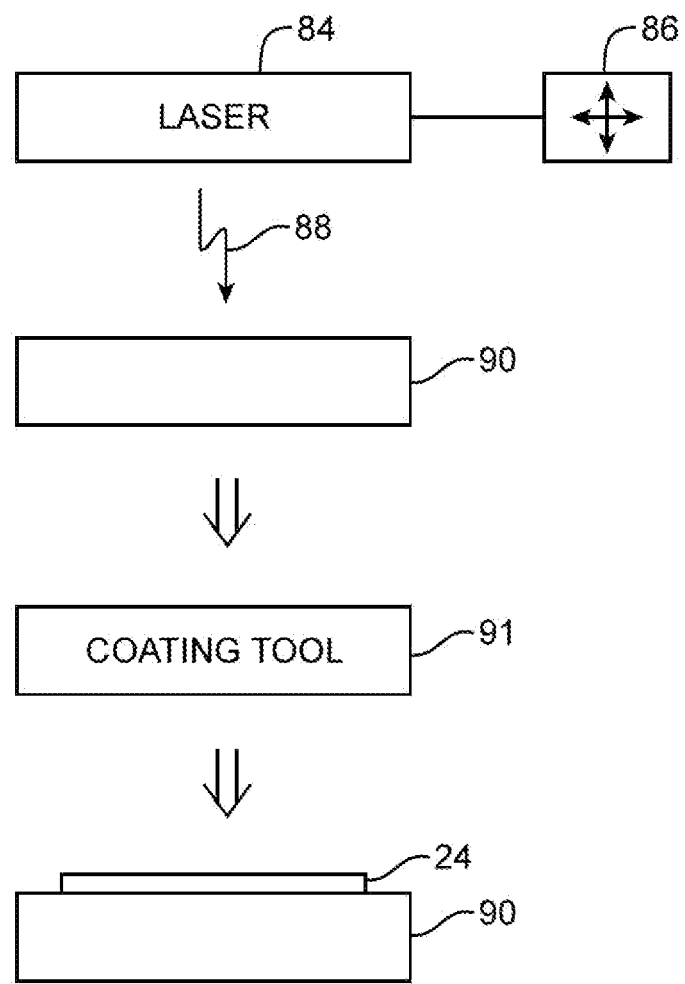
FIG. 7 is a diagram showing how laser patterning techniques may be using to pattern conductive structures for an embedded antenna in accordance with an embodiment of the present invention.

Use of an illustrative laser patterning technique in forming an antenna resonating element and subsequent steps involved in attaching the antenna resonating element to a conductive antenna cavity are shown in FIG. 7. As shown in FIG. 7, the relative position between laser 84 and substrate 90 may be controlled using one or more positioners such as positioner 86. Positioners such as positioner 86 may be implemented using computer-controlled translation stages or other computer-controlled actuators. Substrate 90 may be a dielectric substrate (e.g., a plastic substrate) with a composition that allows sensitization upon exposure to laser light).

After moving laser beam 88 over the surface of substrate 90, metal may be added using coating tool 91 to the sensitized portions of substrate 90 using electrochemical deposition (e.g., electroplating) to form antenna resonating element traces for antenna structures 24.

Figure 8:
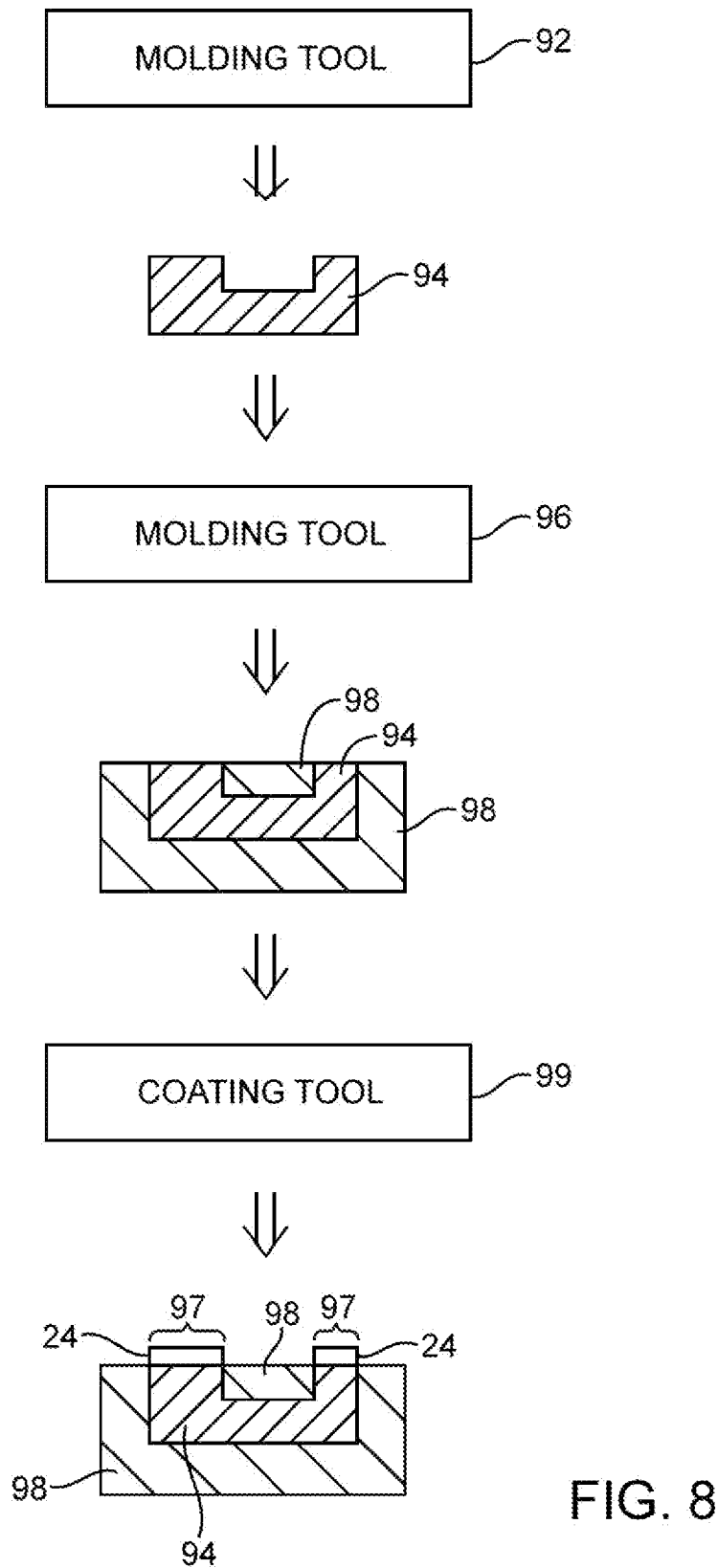
FIG. 8 is a diagram showing how a two-shot molding process may be used in forming a patterned conductive structure for an antenna in accordance with an embodiment of the present invention.

FIG. 8 shows how a substrate for antenna structures 24 may be formed using a two-shot molding technique. With this type of arrangement, first substrate portion 94 may be formed using a first thermoplastic molding process implemented using molding tool 92. A second substrate portion such as portion 98 may then be molded to the first portion using molding tool 96. Portion 94 may have an affinity for metal deposition during exposure to electrochemical deposition processes (e.g., during electroplating), whereas portion 98 may be resistant to metal deposition. During electrochemical deposition operations (e.g., metal plating operations) using coating tool 99, metal will therefore be deposited in regions 97 to form metal antenna traces for antenna structures 24, as shown in the lower portion of FIG. 8.

Use of two different types of thermoplastic in a two step molding process of the type shown in FIG. 8 is sometimes referred to as a "two-shot" molding process. Portion 94 may be referred to as a first shot of plastic and portion 98 may be referred to as a second shot of plastic. The resulting substrate that is formed may be referred to as a two-shot plastic substrate. Because the first and second shots of material have different metal deposition affinities, metal tends to build up selectively during electroplating, allowing the formation of desired antenna structure patterns (e.g., ground plane patterns, antenna resonating element patterns, and or parasitic antenna element patterns).

The plastics that are used in forming two-shot plastic substrates, the plastics that are used in other antenna structure substrates, and the plastics that are used in overmolding plastic around the antenna structures may use any suitable types of plastic material. Examples of thermoplastic materials suitable for injection molding include polycarbonate (PC), acrylonitrile butadiene styrene (ABS), and blends of polycarbonate and acrylonitrile butadiene styrene (PC/ABS). Other moldable dielectric materials may be used, if desired.

Antenna structures formed with traces that are deposited using two-shot molding and electroplating techniques of the type described in connection with FIG. 8, antenna structures formed using other suitable selective metal deposition schemes (e.g., laser-based selective metal deposition schemes of the type shown in FIG. 7), antenna structures formed using equipment of the type shown in FIG. 6 (e.g., flex circuits, stamped metal foil, etc.), or antenna structures formed with other equipment may be used in forming overmolded antenna structures.

Figure 9:
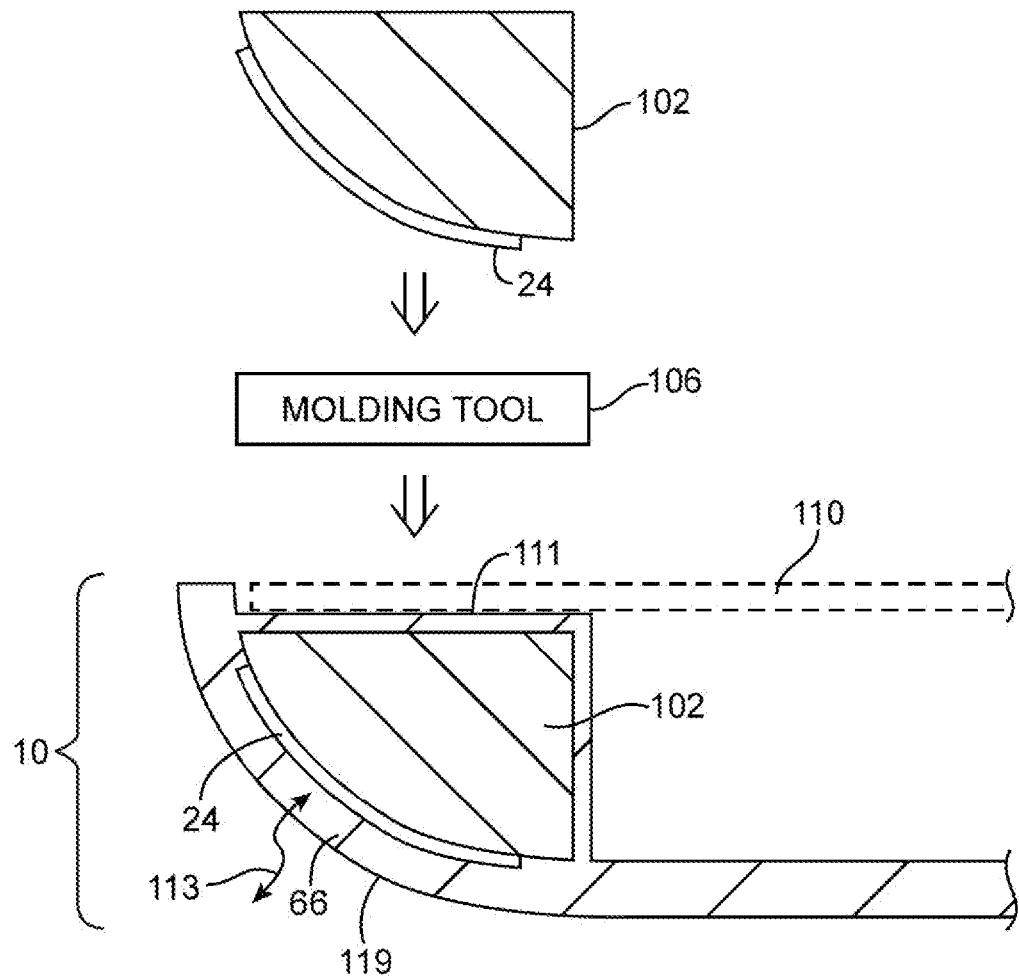
FIG. 9 is a diagram showing how a dielectric structure with a patterned metal part may be embedded within another dielectric structure such as an overmolded plastic housing structure in accordance with an embodiment of the present invention.

FIG. 9 shows how antenna structures that have been formed on dielectric substrate 102 (e.g., using molding techniques, laser-based processing techniques, two-shot molding techniques, or other suitable techniques) may be overmolded to produce housing structures such as housing wall 66.

Initially, antenna structures 26 may be formed using substrate 102 (e.g., using laser-based processing, two-shot molding and electroplating, etc.). Molding tool 106 may then be used to overmold plastic 66 to form a desired device structure. In the example of FIG. 9, the structure that is produced by molding tool 106 is a housing structure for housing 12 (i.e., a housing wall structure such as wall 66). In general, any suitable dielectric structure for device 10 may be formed by overmolding plastic 66 over antenna structures 26 (including any associated dielectric substrates such as substrate 102). The illustrative housing structures formed from overmolding antenna structures 24 in FIG. 9 are merely illustrative.

To complete assembly of device 10, additional components maybe mounted within the housing formed by housing wall structure 66. For example, electrical components such as storage and processing circuitry 28 and transceiver circuitry 26 of FIG. 2 and other electrical components may be mounted in housing 66. A display may be mounted in housing 66. A display cover glass may be incorporated into device 10 to cover the display, as shown by dashed line 110. The cover glass may, if desired, rest on a ledge such as ledge 111 that is formed from overmolded antenna structures 24 (e.g., a ledge or other support structure that is formed as part of molded plastic housing structures 66). During operation, the material of wall 66 may allow radio-frequency antenna signals from antenna structures 24 to pass in and out of device 10, as shown by wireless signals 113.

The thickness of housing wall 66 may be configured to have a sufficient size to ensure that housing wall 66 is structurally sound, while the overmolding arrangement simultaneously allows the metal structures that make up antenna structures 24 to lie relatively close to the exterior surface of housing wall 66 and device 10. With one suitable arrangement, the wall thickness of wall 66 may be 0.1 to 5 mm thick, less than 6 mm, less than 3 mm, more than 0.1 mm, or another suitable thickness. The distance between antenna structures 24 and outer surface 119 of housing wall 66 may be, for example, 0.1 to 5 mm, less than 6 mm, more than 0.1 mm, less than 3 mm, less than 2 mm, less than 1 mm, less than 0.5 mm or other suitable distance.

Figure 10:
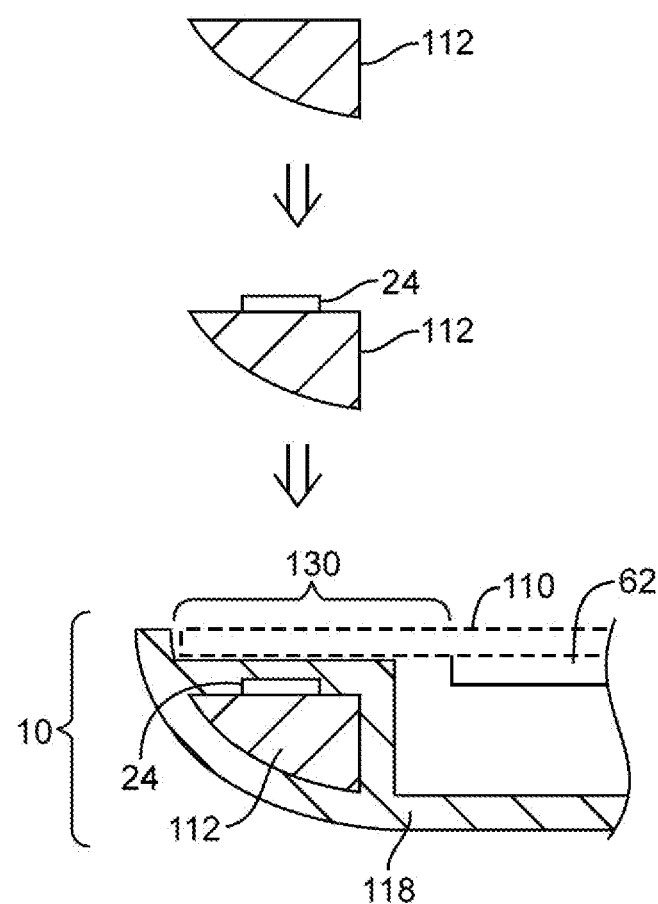
FIG. 10 is a diagram showing how antenna structures may be formed under an inactive display region in accordance with an embodiment of the present invention.

As shown in FIG. 10, antenna structures 24 may be formed under an inactive display region such as inactive display region 130 of display cover layer 110 (i.e., a portion of display 14 outside of the active region defined by display module 62).

Initially, antenna structures 24 may be formed on a substrate such as substrate 112 (e.g., using insert molding, laser-based processing, two-shot molding and electroplating, or other suitable patterning techniques).

Following formation of antenna structures 24, antenna structures 24 may be overmolded with plastic 118 using an injection molding tool. The molding process may embed antenna structures 24 (and optionally some or all of substrate 112) within plastic 118. Plastic 118 may be used in forming a dielectric structure for device 10 such as a housing wall in housing 12.

Display cover layer 110 may be used in covering display module 62 for display 14. Once covered, wireless antenna signals that are transmitted by antenna structures 24 and wireless antenna signals that are received by antenna structures 24 may pass through inactive region 130 of display cover layer 110. If desired, a layer of opaque masking material such as black ink or opaque plastic may be placed on the underside of display cover layer 110 in region 130 to help conceal antenna structures 24 from view by a user of device 10.

Antenna structures 24 may also be configured to use arrangements of the type shown in FIG. 10 (in which the antenna structures are located under a portion of cover layer 110) and arrangements of the type shown in FIGS. 5, 6, and 9 (in which antenna structures are located under an exterior housing structure such as housing wall 66 of FIG. 5, a housing wall formed by plastic 82 of FIG. 6, or a housing wall formed by overmolded plastic 66 of FIG. 9). For example, antenna structures may be formed that have both an upper portion (under display layer 110) and a lower portion (e.g., a portion that is located just under the surface of an overmolded plastic housing wall). The overmolded plastic housing wall may be curved, straight (e.g., to form vertical sides or part of a horizontal planar rear housing structure), or may have other suitable cross-sectional shapes.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a molded plastic housing structure;
   a display having a display cover layer; and
   antenna structures embedded within the molded plastic housing structure, wherein the antenna structures comprise a metal antenna resonating element having metal traces on a dielectric substrate, and wherein the molded plastic housing structure is molded over the patterned metal traces and the dielectric substrate so that the patterned metal traces and the dielectric substrate are completely covered by the molded plastic housing structure, wherein the dielectric substrate comprises a curved surface and first and second planar surfaces, wherein a given one of the first and second planar surfaces supports the display cover layer.

2. The electronic device defined in claim 1 wherein the metal antenna resonating element traces comprise laser-patterned metal traces on the dielectric substrate and wherein the molded plastic housing structure is molded over the laser-patterned metal traces and the dielectric substrate.

3. The electronic device defined in claim 1 wherein the dielectric substrate comprises a two-shot plastic substrate having first and second plastic portions with different affinities for metal, wherein the metal antenna resonating element traces comprise metal traces on the two-shot plastic substrate, and wherein the molded plastic housing structure is molded over the metal antenna resonating element traces and the two-shot plastic substrate.

4. The electronic device defined in claim 1 wherein the antenna structures comprise conductive structures selected from the group consisting of: machined metal structures, metallic paint structures, electrochemically deposited structures, and etched structures.

5. The electronic device defined in claim 1 wherein the molded plastic housing structure comprises a housing wall.

6. The electronic device defined in claim 5 wherein the antenna structures comprises planar structures that run parallel with an exterior surface of the housing wall.

7. The electronic device defined in claim 5, wherein the antenna structures are embedded within the housing wall so that the antenna structures are separated from an exterior surface of the housing wall by less than 3 mm.

8. The electronic device defined in claim 1 wherein the metal antenna resonating element comprises patterned metal traces on a printed circuit substrate and wherein the molded plastic housing structure is overmolded over the patterned metal traces and the printed circuit substrate.

9. The electronic device defined in claim 1, wherein the molded plastic housing structure comprises an injection molded plastic housing structure and wherein the antenna structures are embedded within the injection molded plastic housing structure.

10. A method of forming electronic device structures comprising:
    forming antenna structures for the electronic device; and
    overmolding plastic over the antenna structures, wherein the antenna structures comprise a metal antenna resonating element having metal traces on a dielectric substrate and wherein overmolding the plastic comprises molding the plastic over the patterned metal traces and the dielectric substrate so that the patterned metal traces and the dielectric substrate are completely covered by the molded plastic, wherein the dielectric substrate comprises a curved surface and first and second planar surfaces, wherein a given one of the first and second planar surfaces supports a display cover layer.

11. The method defined in claim 10 wherein overmolding the plastic comprises injection molding plastic housing structures over a conductive antenna resonating element in the antenna structures.

12. The method defined in claim 11 wherein forming the conductive antenna resonating element comprises using a process selected from the group consisting of: a metal machining process, a metallic paint deposition process, an electrochemical metal deposition process, and a chemical etching process.

13. The method defined in claim 10 wherein forming the antenna structures comprises forming patterned traces on a printed circuit substrate.

14. The method defined in claim 10 wherein forming the antenna structures comprises:
   with at least one molding tool, forming a two-shot plastic substrate having first and second plastic portions with different affinities for metal; and
   forming metal antenna resonating element structures on the dielectric substrate, wherein overmolding the plastic comprises overmolding the plastic over the metal antenna resonating element structures and the dielectric substrate.

15. The method defined in claim 10 wherein overmolding the plastic comprises injection molding the plastic to form electronic device housing wall structures in which the antenna structures are embedded.

16. The method defined in claim 15 wherein forming the antenna structures comprises forming a patterned planar metal antenna resonating element structure and wherein injection molding the plastic comprises molding the plastic over the metal antenna resonating element structure so that the metal antenna resonating element structure is separated from an exterior surface of the electronic device housing wall structures by less than 3 mm.

17. An electronic device having an interior and an exterior, comprising:
   a molded plastic housing wall that is located at the exterior of the electronic device;
   antenna structures embedded within the molded plastic housing wall, wherein the antenna structures comprise metal traces on a dielectric substrate, the dielectric substrate has a first planar surface facing the interior of the electronic device and a curved surface formed on an opposing side of the dielectric substrate from the first planar surface, wherein the molded plastic housing wall is molded over a portion of the metal traces and the dielectric substrate so that the molded plastic housing wall contacts and covers the first surface of the dielectric substrate, and wherein the dielectric substrate further comprises a second planar surface that extends substantially perpendicular from the first planar surface towards the curved surface; and
   a display cover layer supported by the first planar surface of the dielectric substrate.

18. The electronic device defined in claim 17, wherein the metal traces are formed on the curved surface of the dielectric substrate.

* * * * *